(12) United States Patent
Gandhi et al.

(10) Patent No.: US 11,087,314 B2
(45) Date of Patent: Aug. 10, 2021

(54) ADAPTIVE REMITTANCE LEARNING

(71) Applicant: The Toronto-Dominion Bank, Toronto (CA)

(72) Inventors: Rajeev Kumar Gandhi, Mississauga (CA); Robert Kyle Miller, Mississauga (CA); Kushank Rastogi, Toronto (CA); David Samuel Tax, Toronto (CA); Milos Dunjic, Oakville (CA); Arthur Carroll Chow, Markham (CA); Armon Rouhani, Mississauga (CA); Maryam Karbasi, Toronto (CA); Kamana Tripathi, Toronto (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 135 days.

(21) Appl. No.: 16/142,825

(22) Filed: Sep. 26, 2018

(65) Prior Publication Data

US 2020/0097955 A1    Mar. 26, 2020

(51) Int. Cl.
*G06Q 40/00* (2012.01)
*G06Q 20/38* (2012.01)
*G06N 20/00* (2019.01)

(52) U.S. Cl.
CPC ........... *G06Q 20/381* (2013.01); *G06N 20/00* (2019.01)

(58) Field of Classification Search
CPC ...... G06Q 20/10; G06Q 20/381; G06Q 20/02; G06Q 20/3223; G06N 20/00
See application file for complete search history.

(56) References Cited

U.S. PATENT DOCUMENTS 6,519,576 B1    2/2003 Freeman
8,121,894 B2    2/2012 Mason
(Continued)

FOREIGN PATENT DOCUMENTS

CA    2947897 A1 *    5/2017    ............. G06Q 40/06

OTHER PUBLICATIONS

Hatlani: "A Study Into Money Transfer Agencies' Impact On Foreign Currency Generation in Zimbabwe From 2007 to 2012", Bindura University of Science Education. Faculty of Commerce (Year: 2012).*

*Primary Examiner* — Edward J Baird
(74) *Attorney, Agent, or Firm* — Fish & Richardson P.C.

(57) ABSTRACT

The present disclosure involves systems, software, and computer implemented methods for a remittance system that pre-populates remittance data based on historical usage of remittance transactions. One example system includes operations to generate, using a predictive model, data indicating a predicted likelihood of a user selecting at least one data exchange transaction, wherein the data indicates the predicted likelihood of the user performing the at least one data exchange transaction. A request is received to access a remittance page. In response, the at least one data exchange transaction that was previously generated is selected from a repository of predicted likelihoods. Remittance data associated with a UI element is generated that includes the at least one data exchange transaction. The remittance data is transmitted to the device. An indication from the device is received for interacting with the UI element. The data exchange transaction is executed in response to receiving the indication.

15 Claims, 6 Drawing Sheets

(56) References Cited

U.S. PATENT DOCUMENTS

| | | |
|---|---|---|
| 8,165,956 B2 | 4/2012 | Kitchen et al. |
| 8,244,609 B2 | 8/2012 | Prakash et al. |
| 8,374,962 B2 | 2/2013 | Abelman et al. |
| 9,953,378 B2 | 4/2018 | Purves et al. |
| 2003/0178281 A1* | 9/2003 | Goto ........................ G07F 19/20 194/206 |
| 2007/0295803 A1* | 12/2007 | Levine .................... G06Q 20/04 235/379 |
| 2010/0287114 A1* | 11/2010 | Bartko .................... G06Q 40/06 705/36 R |
| 2011/0238428 A1* | 9/2011 | Kawamoto ............ G06N 7/005 705/1.1 |
| 2014/0046828 A1* | 2/2014 | Rivet ..................... G06Q 40/12 705/38 |
| 2016/0104159 A1* | 4/2016 | Butterfield ........... G06Q 20/405 705/44 |
| 2016/0110467 A1* | 4/2016 | Hern ....................... H04L 67/22 235/375 |
| 2016/0117666 A1 | 4/2016 | Davis et al. |
| 2017/0270534 A1* | 9/2017 | Zoldi ................. G06Q 20/4016 |
| 2017/0316440 A1 | 11/2017 | Isaacson et al. |
| 2018/0114216 A1* | 4/2018 | Joseph ............... G06Q 20/4016 |

\* cited by examiner

ADAPTIVE REMITTANCE LEARNING

TECHNICAL FIELD

The present disclosure relates to computer-implemented methods, software, and systems for a remittance system that pre-populates remittance data in a user interface based on historical remittance transactions.

BACKGROUND

Generally, money transferred to friends, relatives, and businesses across borders requires foreign exchange calculations that ensure the amount of origin funds match the destination funds. Typically, users have to manually calculate foreign transaction fees by themselves, to figure out what the total destination local currency will be from the total source local currency. For example, a customer has to manually determine how many Canadian Dollars and fees are required to transmit payment for a parent's house rent of $200 in the Philippines. In addition, the users have to manually ensure that they have sufficient bank funds in order to transfer the total source local currency to match the total destination local currency. Thus, this time consuming and tedious process can result in miscalculations and ultimately, resulting in an incorrect amount of money transferred.

SUMMARY

The present disclosure involves systems, software, and computer implemented methods for a remittance system that pre-populates remittance data in a user interface based on historical remittance transactions. One example system includes a communications module, at least one set of memory storing instructions and a repository of predicted likelihoods for data exchange transactions, each of the predicted likelihoods associated with a corresponding data exchange transaction, and at least one hardware processor interoperably coupled with the at least one memory and the communications module. The instructions stored in the at least one memory can instruct the at least one hardware processor to perform various operations. For example, the instructions can cause the at least one processor to generate, using a predictive model, data indicating a predicted likelihood of a user selecting at least one data exchange transaction, wherein the data indicating the predicted likelihood of the user performing the at least one data exchange transaction is based on at least one exchange rate for a data exchange and at least one previous data exchange of the user. The at least one data exchange transaction is stored in response to determining the data indicating the predicted likelihood corresponding to the data exchange transaction is greater than a threshold value.

Next, a request from a device associated with the user can be received via the communications module to access a remittance page. In response to receiving the request, the at least one data exchange transaction that was previously generated is selected from the repository of predicted likelihoods for data exchange transactions. Remittance data associated with a user interface (UI) element is generated, the remittance data including data associated with the data exchange transaction and instructions associated with the UI element.

The remittance data is transmitted via the communications module and to the device. An indication from the device for interacting with the UI element corresponding to the data exchange transaction is received. The data exchange transaction is executed in response to receiving the indication.

Implementations can optionally include one or more of the following features.

In some instances, the instructions further include the data exchange transaction includes a currency exchange transaction.

In some instances, the instructions further include the at least one exchange rate comprises a rate for a source country, a rate for a destination country, a conversation rate between the source country and the destination country, and a current time of the exchange rate.

In some instances, the instructions further include the predictive model comprises at least one of a classification model or a probabilistic model.

In some instances, the instructions further include generating the remittance data including the UI element that further includes generating a selectable UI element button for receiving a selection from the user for selecting the currency exchange transaction to execute.

In some instances, the instructions further include generating the selectable UI element button for receiving the selection from the user for selecting the currency exchange transaction to execute further instructions comprising generating the selectable UI element button for displaying to the user data pertaining to the currency exchange transaction a source country, a destination country, a source amount, a destination amount, an exchange rate, and a current time.

In some instances, the instructions further include the data associated with the currency exchange transaction which further comprises a sending amount, a received amount, a time for executing the particular transaction, an elapsed time in which the exchange rate is currently locked, the current balance of the user, a location for sending the currency exchange transaction, a location, and a remaining balance of the user after the currency exchange transaction is to be executed.

In some instances, the instructions further include the currency exchange transaction being associated with an exchange rate, and wherein receiving, via the communications module, the indication from the user for interacting with the UI element corresponding to the currency exchange transaction further including: determining, in response to receiving the indication from the user for interacting with the UI element corresponding to the currency exchange transaction, that the exchange rate for the currency exchange transaction has changed from a previously presented exchange rate in the remittance data to a new exchange rate after transmitting the remittance data; transmitting, via the communications module, a notification to the user indicating that the exchange rate has changed to the new exchange rate and a request for approval from the user to proceed with the currency exchange transaction using the new exchange rate; and in response to receiving an indication of the approval, executing the currency exchange transaction using the new exchange rate.

In some instances, the instructions further include generating the data indicating a predicted likelihood of the user selecting the currency exchange transaction further comprising: generating, using the predictive model, data indicating a predicted likelihood of the user selecting a currency exchange transaction from a plurality of currency exchange transactions for a location from a plurality of locations; comparing each of the predicted likelihoods to the threshold value; in response to determining one or more predicted likelihoods that are greater than the threshold value, ranking each of the currency exchange transactions corresponding to each of the predicted likelihood that is greater than the threshold value; and storing each ranked currency exchange transaction that corresponds to each of the predicted likelihoods that is greater than the threshold value with the customer account information to display on the graphical user interface.

In some instances, the instructions further include the at least one previous transaction of the user comprising a transmitted currency from the user, a received currency by a recipient, a time at which the at least one previous transaction was submitted, and an exchange rate of the at least one previous transaction.

In some instances, the instructions further include that the data indicating the predicted likelihood of the user selecting the currency exchange transaction is further based on current account information that comprises an identification of the user, an account balance of the user, and a current time of the account balance.

In some instances, the instructions further include the exchange rate and the current time are transmitted with customer account information and the remittance data for presentation in association with the selectable UI element button.

In some instances, the instructions further include that the currency exchange transaction is associated with a foreign currency exchange transaction.

In some instances, the instructions further include that the currency exchange transaction is associated with a digital currency exchange transaction.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or may be further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

The present disclosure describes various tools and techniques associated with a data analysis exchange system that supports automatically generating and providing a remittance transaction to a user based on a predicted likelihood that the user is to select to execute the remittance transaction. The data analysis exchange system can generate one or more predicted likelihoods corresponding to one or more remittance transactions that a user will select for a subsequent transaction using a classification model. The one or more remittance transactions for a particular user can be for various source locations and various destination locations for various transactions. A user can provide a request, e.g., through an interface on a client device (e.g., a conversational interface), to the data analysis exchange system, where the data analysis exchange system can retrieve from the one or more remittance transactions a top or relatively more likely set of remittance transactions based on the one or more predicted likelihoods of the one or more remittance transactions. The data analysis exchange system can generate user interface data that includes the remittance transaction or transactions from the top remittance transactions that enables the user to select the particular remittance transaction to be executed. In response, the user can interact with the user interface data to indicate to the data analysis exchange system to execute the corresponding remittance transaction.

By generating predicted likelihoods for remittance transactions before receiving a request from a user, the data exchange analysis system can predict the transactions that a user is most likely to desire to execute. This predictive solution can speed up the time in which a user can identify and select a particular remittance transaction to execute, particularly where one or more of the proposed remittance transactions are performed regularly over time. In addition, this saves the user time by pre-calculating one or more of the exchange rates for a desired remittance transaction at an exact time, the amount to be delivered by a sender in a first currency, and the amount to be delivered to a recipient in a second currency. Thus, the user can immediately select the user interface element associated with a particular transaction to initiate the selected transaction without having to perform or input any manual calculation for the desired remittance transaction.

Figure 1:
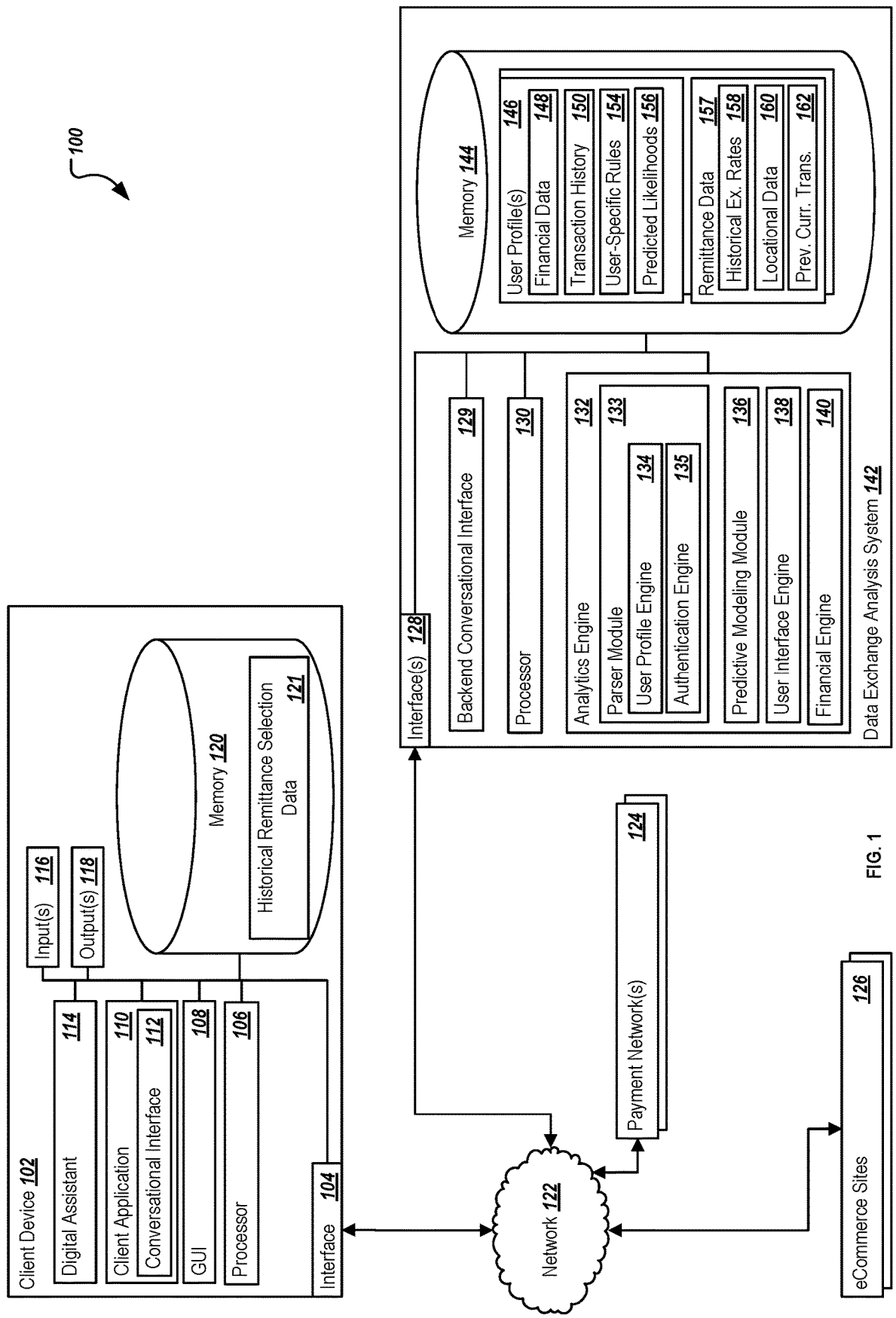
FIG. 1 is a block diagram illustrating an example system for a remittance system that manages providing a remittance transaction based on a predicted likelihood of a user executing the remittance transaction.

Turning to the illustrated example implementation, FIG. 1 is a block diagram illustrating an example system for a remittance system 100 that manages providing a remittance transaction based on a predicted likelihood of a user executing the remittance transaction. System 100 includes functionality and structure associated with receiving inputs from a client device 102 (associated with a user), analyzing the received input at the data exchange analysis system 142 to retrieve a remittance transaction corresponding to a predicted likelihood and in response to receiving the input, generating a user interface (UI) element that includes the remittance transaction and other corresponding data. The data exchange analysis system 142 can then provide a response on the request to the client device 102 in response to providing the input to the data exchange analysis system 142. The illustrated system 100 includes or is communicably coupled with a data exchange analysis system 142, client device 102, one or more payment networks(s) 124, one or more electronic commerce (eCommerce) sites 126, and a network 122. System 100 is a single example of possible implementations, with alternatives, additions, and modifications possible for performing some or all of the described operations and functionality. Although shown separately, in some implementations, functionality of two or more systems, servers, or illustrated components may be provided by a single system or server. In some implementations, the functionality of one two or more systems, servers, or illustrated components may be provided by a single system or server. In some implementations, the functionality of one illustrated system or server may be provided by multiple systems, servers, or computing devices, including those physically or logically local or remote to each other. Any combination or permutation of systems may perform the functionality described herein. In some implementations, particular operations and functionality described herein may be executed at either the client device 102, the data exchange analysis system 142, or at one or more other non-illustrated components, as well as at a combination thereof.

As used in the present disclosure, the term "computer" is intended to encompass any suitable processing device. For example, client device 102 and the data exchange analysis system 142 may be any computer or processing device (or combination of devices) such as, for example, a blade server, a general-purpose personal computer (PC), MAC, workstation, UNIX-based workstation, embedded system or any other suitable device. Moreover, although FIG. 1 illustrated particular components as a single element, those components may be implemented using a single system or more than those illustrated, as well as computers other than servers, including a server pool or variations that include distributed computing. In other words, the present disclosure contemplates computers other than general-purpose computers, as well as computers without conventional operating systems. Client device 102 may be any system which can request data, execute an application (e.g., client application 110), and/or interact with the data exchange analysis system 142 and the conversational interface 112. In some instances, the conversational interface 112 can be an interface other than a conversational interface. For example, the interface 112 can be a command line interface or a menu interface or any other suitable type of interface. The client device 102, in some instances, may be any other suitable device, including a mobile device, such as a smartphone, a tablet-computing device, a smartwatch, a laptop/notebook computer, a connected device, or any other suitable device. Additionally, the client device 102 may be a desktop or workstation, sever, or any other suitable device. Similarly, the data exchange analysis system 142 may be a server, a set of servers, a cloud-based application or system, or any other suitable system. In some instances, the client device 102 may execute on or be associated with a system executing the data exchange analysis system 142. In general, each illustrated component may be adapted to execute any suitable operating system, including Linux, UNIX, Windows, Mac OS®, Java™, Android™, Windows Phone OS, or iOS™, among others.

The data exchange analysis system 142 can perform functionality associated with one or more interfaces 128, can perform operations associated with receiving input from a client device 102 (e.g., via conversational interface 112) associated with the one or more interfaces 128, and can analyze the received input to determine a context or an intent of the input (e.g., a particular question, a query, a comment, or other communication to which a response may be generated for the conversational interface 112). Using the determined context or the determined intent of the input, the data exchange analysis system 142 can retrieve a particular remittance transaction corresponding to a predicted likelihood stored in the memory and generate a UI element that includes the particular remittance transaction and other data to the client device 102 in response. Once the data exchange analysis system 142 provides the response to the client device 102, the data exchange analysis system 142 can receive an indication from the client device 102 that indicates whether the user selected, via the client application 110, to execute the remittance transaction or not. If the client application 110 provides the indication to the data exchange analysis system 142, the data exchange analysis system 142 executes the remittance transaction.

As illustrated, the data exchange analysis system 142 includes one or more interfaces 128, a backend conversational interface 129, a processor 130, an analysis engine 132, and memory 144. Different implementations may include additional or alternative components, with FIG. 1 meant to be an example illustration of one possible implementation. While illustrated separate from one another, at least some of these components, in particular the backend conversational interface 129 and the analytics engine 132 may be combined within a single component or system, or may be implemented separate from one another, including at different systems and/or at remote components.

Interface 128 is used by the data exchange analysis system 142 for communicating with other systems in a distributed environment—including within the environment 100—connected to the data exchange analysis system 142 and/or network 122, e.g., client device 102, one or more payment network(s) 124, and/or any other eCommerce sites 126, as well as other systems or components communicably coupled to the network 122. Generally, the interface 128 includes logic encoded in software and/or hardware in a suitable combination and operation to communicate with the network 122 and other communicably coupled components. More specifically, the interface 128 may include software supporting one or more communication protocols associated with communications such that the data exchange analysis system 142, network 122, and/or interface's hardware is operable to communicate physical signals within and outside of the illustrated environment 100.

Network 122 facilitates wireless or wireline communications between the components of the environment 100 (e.g., between combinations of the data exchange analysis system 142, client device(s) 102, and/or other components, among others) as well as with any other local or remote computer, such as additional mobile devices, clients, servers, remotely executed or located portions of a particular component, or other devices communicably coupled to network 122, including those not illustrated in FIG. 1. In this illustrated environment, the network 122 is depicted as a single network, but may be comprised of more than one network without departing from the scope of this disclosure, so long as at least a portion of the network 122 may facilitate communication between senders and recipients. In some instances, one or more of the illustrated components (e.g., the data exchange analysis system 142) or portions thereof (e.g., the analytics engine 132 or other portions) may be included within network 122 as one or more cloud-based services or operations. The network 122 may be all or a portion of an enterprise or secured network, while in another instance, as least a portion of the network 122 may represent a connection to the Internet. In some instances, a portion of the network 122 may be a virtual private network (VPN) or an Intranet. Further, all or a portion of the network 122 can comprise either a wireline or wireless link. Example wireless links may include 802.11a/b/g/n/ac, 802.20, WiMax, LTE, and/or any other appropriate wireless link. In other words, the network 122 encompasses any internal or external network, networks, sub-network, or combination thereof operable to facilitate communications between various computing components inside and outside the illustrated environment 100. The network 122 may communicate, for example, Internet Protocol (IP) packets, Frame Relay frames, Asynchronous Transfer Mode (ATM) cells, voice, video, data, and other suitable information between network addresses. The network 122 may also include one or more local area networks (LAMs), radio access networks (RANs), metropolitan area networks (MANs), wide area networks (WANs), all or a portion of the internet and/or any other communication system or systems at one or more locations.

The data exchange analysis system 142 also includes one or more processors 130. Although illustrated as a single processor 130 in FIG. 1, multiple processors may be used according to particular needs, desires, or particular implementations of the environment 100. Each processor 130 may be a central processing unit (CPU), an application specific integrated circuit (ASIC), a field-programmable gate array (FPGA), or another suitable component. Generally, the processor 130 executes instructions and manipulates data to perform the operations of the data exchange analysis system 142, in particular those related to executing the various modules illustrated therein and their related functionality. Specifically, the processor 130 executes the algorithms and operations described in the illustrated figures, as well as the various software modules and functionalities, including the functionality for sending communications to and receiving transmissions from the client device 102, the eCommerce sites 126, and the payment networks 124, as well as to process and prepare responses to received input associated with a conversational interface 112. Each processor 130 may have a single core or multiple cores, with each core available to host and execute an individual processing thread.

Regardless of the particular implementations, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™, Visual Basic, assembler, Perl®, Swift, HTML5, any suitable version of 4GL, as well as others.

As illustrated, the data exchange analysis system 142 includes, is associated with, and/or executes the backend conversational interface 129. In some instances, the client device 102 may interact with the data exchange analysis engine using specified commands and interactions that do not use the conversational interface 112 or the backend conversational interface 129. Rather the specified commands and interactions from the client device 102 can be directly transmitted to the analytics engine 132. The backend conversational interface 129 may be a program, module, component, agent, or any other software component which manages and conducts conversations and interactions via auditory or textual methods, and which may be used to simulate how a human would behave as a conversational partner. In some instances, the backend conversational interface 129 may be executed remotely from the data exchange analysis system 142, where the data exchange analysis system 142 performs operations associated with retrieving one or more remittance transactions associated predicted likelihoods and can assist in determining the intent or content of the response and/or the responses to be provided. The backend conversational interface 129 may be accessed via a website, a web service interaction, a particular application (e.g., client application 110), or it may be a backend portion of a digital or virtual assistant application or functionality of a particular operating system, such as Apple's Siri, Google's Assistant, Amazon's Alexa, Microsoft's Cortana, or others. In some instances, a remote agent or client-side portion of the conversational interface 112 may execute at the client device 102, where inputs can be provided and responses presented to the user of the client device 102, while some or all of the processing is performed at the data exchange analysis system 142 and the backend conversational interface 112. In some instances, the backend conversational interface 129 may interact with or otherwise manage standard or traditional interactions associated with the client application 110, and may not correspond to a particular conversational interface 129.

The analytics engine 132 represents any engine that can perform operations related to understanding, interpretation of, and actions performed related to a set of received input received at the backend conversational interface 129. Additionally, the analytics engine 132 can generate one or more predicted likelihoods corresponding to one or more remittance transactions for a particular user. The analytics engine 132 can, in some instances, also generate UI elements and/or graphics data to provide to a user corresponding to the client device 102. Examples of the analytics engine 132 that could be used or implemented include a plurality of web services and backend applications, including IBM's Watson, Google Cloud Natural Language API, Amazon Lez, Microsoft Cognitive Services, as well as any proprietary solution, application, or service. The processing performed by the analytics engine 132 includes processing the received input identifying a context or intent associated with the input received via the backend conversational interface 129, is performed by the parser module 133. The parser module 133 includes the user profile engine 134 and the authentication engine 135.

The parser module 133 analyzes the received request from the client device 102. In particular, the request may include a notification from a user to perform a remittance transaction. For example, the request may include a notification to access a particular webpage or application that allows a user to execute a particular remittance transaction. In another example, the request may include a notification to access a particular webpage or application that allows a user to request financial data from his or her one or more financial accounts. The parser module 133 can also determine from the received request which user transmitted the request and from which client device 102 that request came from. In some instances, the parser module 133 may directly receive an instruction associated to perform a remittance transaction from client device 102, while in others, the parser module 133 can interpret a more general request and, based on the request, the request's context, and/or historical requests by the user, among other information, determine that a remittance transaction is to be performed.

The parser module 133 can include a user profile engine 134 to obtain additional information about a particular user profile associated with the received input. The user profile engine 134 can be used to add user profile information to or incorporate user profile information into a request to help in retrieving one or more remittance transactions corresponding to one or more generated predicted likelihoods. In particular, the user profile engine 134 can retrieve data associated with a particular user profile (determined from the received input) within a plurality of user profiles 146. In some instances, the user profile engine 134 can identify a set of preferences previously defined by the user or dynamically determined based on previous interactions and other user operations. Additionally, the user profile 146 for a particular user can also include social network data that may identify particular social network profiles and/or login credentials associated with one or more social networks. The user profile engine 134 can use that information to access a particular social network (e.g., Facebook, Twitter, Reddit, Instagram, etc.) and obtain information about particular social network activities of the user, including particular persons, entities, and other accounts with which the user follows, likes, or otherwise has interacted with as defined by a social network user profile, where that information identifies particular public personalities or entities with which later persona-based content and enhancements can be used. In some instances, at least some of the information may be available within the social network data without requiring the user profile engine 134 or another component to access the social networks at the time of the interaction with the backend conversational interface 129. In some instances, the social network corresponding to the user profile 146 can be used to post a generated remittance transactions for a user to review and accept for executing the remittance transaction.

Further, the user profile 145 may store or provide access to financial data 148 and transaction history 150 associated with the user profile 146 for a corresponding user, including transaction histories, current account information, stock information associated with the user profile 146, credit and debit cards associated with the user profile 146, checking and savings account information, previous remittance transaction data, and other similar data. In some instances, information to access such information may be stored in the financial data 148 and the transaction history 150, and the user profile engine 134 can use that data to access the accounts or other relevant data in real-time during the interactions between the conversational interface 112 and the backend conversational interface 129. In some instances, location information associated with the user may be included in the user profile 146, or may be accessible via the client device 102 or other means. The location information can be used to personalize responses and to include that information as part of the analysis to retrieve the remittance transaction. Additionally, the location information may include one or more locations to which user requests to send financial data and one or more locations from which the user requests to send financial data. In some instances, those locations may be used as part of the analysis to determine a likelihood of a present remittance transaction. The one or more locations that the user requests to send financial data and the one or more locations the user requests to send financial data from can be different from a current location of the user.

The parser module 133 can also include an authentication engine 135. The authentication engine 135 can retrieve data from the request to identify and/or verify the credentials of the user. Each user profile 146 can include authentication or information and/or credentials to authenticate the user. In particular, when a user provides a request from the client device 102 to access remittance data, that request may be associated with or can include one or more credentials of the user. For example, the one or more credentials can include a username, a password, a token for authentication, and other authentication credential data. Upon the data exchange analysis system 142 receiving the requested input, the authentication engine 135 can retrieve the one or more credentials from or associated with the requested input to determine which user sent the request. In particular, the authentication engine 135 can compare the one or more credentials to the authentication data corresponding to each user profile 146. Once the authentication engine 135 finds a match between one or more credentials in the received input to a particular authentication in a corresponding user profile 146, the authentication engine 135 can determine who the user is that sent the received input, or can confirm that the one or more credentials provided by or associated with the request is authenticated from the client device 102. In some instances, the authentication engine 138 can generate an authentication credential in response to determining the credentials of the user matching the one or more stored credentials. The generated authentication credential can include one or more keys, a token, an identifier of the accepted credential, or another credential. The generated authentication credential can be provided to the client device 102 once the data exchange analysis system 142 generates and provides the UI data to the client device 102 with the remittance data.

The analytics engine 132 also includes a predictive modeling module 136 that is used for performing one or more functions. In particular, the predictive modeling module 136 can be used to train a neural network model or other machine learning system to generate a particular likelihood of a user selecting a remittance transaction. Additionally, the predictive modeling module 136 generates an indexed data set of predicted likelihoods and corresponding remittance transactions. Lastly, the predictive modeling module 136 selects a predicted likelihood and corresponding remittance transaction to provide to a user in response to receiving a request from a user to access remittance data.

The predictive modeling module 136 trains a neural network model to generate a particular likelihood of a user selecting a remittance transaction. In particular, the predictive modeling module 136 includes a model trainer to train the neural network model or any other type of machine learning model. In some instances, the model may include other classification models, such as multinomial logit models and decision tree models. In other instances, the predictive modeling module 136 can train other models such as numeric models, such as regression models and probability models. For example, a probability model may include the following equations:

$$A = \text{Number of Total Times } X \text{ Sent to } Y \text{ in past}$$

$$B = \text{Number of Times } X \text{ Sent in past}$$

$$A = \text{Number of Times Money sent to } Y \text{ in past}$$

$$P[\text{Transmitting } X \text{ to Location } Y] = \beta_0 + \left(1 - \left(\frac{A-B}{C}\right)\right) * \beta_1$$

In the above equation, the variable A indicates, for example, the number of total times an amount X (e.g., $100) has been sent to a location Y (e.g., France). The variable B indicates, for example, the number of total times an amount X (e.g., $50) has been sent. The variable C indicates, for example, the number of times money has been sent to a location Y (e.g., France) in the past. The variables $\beta_0$ and $\beta_1$ correspond to weighted averages for a particular transaction. The data corresponding to variables, A, B, and C, and the probability of transmitting X to location Y corresponds to a particular user, such as user corresponding to user profile 146.

In another example, the predictive modeling module 136 can train a neural network model. The neural network model may include an input layer, an output layer, and one or more hidden layers. The model trainer may use a machine learning technique to continuously train the neural network model as the system 100 receives more data when applying the model.

The model trainer of the predictive modeling module 136 can train the neural network model. For example, the model trainer can retrieve data corresponding to a particular user profile 146 to train the neural network model. In particular, the data corresponding to the particular user profile 146 can correspond to financial data 148 of the user profile 146, transaction history 150 of the user profile 146, historical exchange rates 158, locational data 160, and previous currency transactions 162. The historical exchange rates 158, the locational data 160, and previous currency transactions 162 are stored in a remittance data module 157. In some instances, the remittance data module 157 corresponds to a user profile 146. In other instances, the remittance data module 157 corresponds to other user profiles 146. The historical exchange rates 158 in the remittance data module 157 can include data of exchange rates over a period of time. For example, the historical exchange rates 158 can include data of exchange rates over a period of 6 months or 1 year. The exchange rates can include Canadian Dollar to US Dollar, Canadian Dollar to the Euro, US Dollar to Canadian Dollar, Euro to Canadian Dollar, US Dollar to Chinese Yuan, Chinese Yuan to US Dollar, and US Dollar to Mexican Peso, to name a few examples. The exchange rates 158 can be various values at different times and indications of how the exchange rates have changed over time. In addition, the exchange rates 158 can be based on one or more previous remittance transactions made by the user. In particular, if the user executed a previous remittance transaction from the Euro to the Russian Ruble and from the Euro to the Indian Rupee, the predictive modeling module 136 can retrieve exchange rates corresponding to each of the historical transactions.

In some instances, the predictive modeling module 136 retrieves locational data 160 corresponding to the user profile 146. The locational data 160 can include a current location of the user corresponding to user profile 146, previous locations of the user corresponding to user profile 146, locations corresponding to a source for a remittance transaction, and locations corresponding to a destination for a remittance transaction. The locational data 160 can include a number of times the user of user profile 146 has transmitted remittance transactions from each of these locations. In some instances, the locational data 160 can also include a number of times the user of user profile 146 has received a remittance transaction at a particular location.

In some instances, the predictive modeling module 136 retrieves previous currency transactions 162 corresponding to or associated with the user profile from the remittance data 157. The previous currency transactions can include a money amount that the user transmitted in one or more previous transactions. In particular, the previous currency transactions can include an amount for how much money was transferred from a source in a first currency and how much money was delivered to a destination in a second currency. For example, a previous currency transaction can include 100 US dollars transferred to a destination in Canada worth 132 Canadian dollars. The previous currency transactions 162 can also include transactions corresponding to users other than the user corresponding to user profile 146. The previous currently transactions 162 can include or identify information regarding various transactions, such as a particular time of day of the particular transaction, transactions at or to different locations around the world, transactions with a similar source, and transactions with a similar destination. The previous currency transactions 162 can also rank each transaction performed by the user corresponding to the user profile 146 based on the number of times a particular transaction is executed. In particular, a user may perform a transaction A from source B to destination C 10 times over a period of 10 months; a transaction D from source B to destination E 5 times over the period of 10 months, and, a transaction F from source G to destination C 2 times over the period of 10 months. The previous currency transactions 162 may store transaction A, transaction D, and transaction F in a ranked fashion based on the number of times the transaction has occurred for easier access. Alternatively, certain transactions may be performed under certain circumstances or in a certain context. When the current circumstances or context corresponds to those of prior currency transactions 162, the likelihood or relevance of those corresponding transactions 162 may be higher based on those circumstances or context.

Each time a remittance transaction occurs, the predictive modeling module 136 can store data in the remittance data 157 corresponding to the performed remittance transaction. For example, the predictive modeling module 136 can store the corresponding exchange rate of the transaction in the historical exchange rates 158, locational data corresponding to the transaction in the locational data 160, such as a location of the user (e.g., using GPS of the client device or another method), a source of the remittance transaction, a destination of the remittance transaction, and a timestamp of the transaction. Additionally, the predictive modeling module 136 can store the amount of the transaction in the previous currency transaction 162. The stored information can be used to train or otherwise refine one or more models associated with the historical remittance data 157.

Once the model has been sufficiently trained by the model trainer, the predictive modeling module 136 can apply the model. In some instances, the predictive modeling module 136 can apply the model during an offline mode of the data exchange analysis system 142, such that the predicted likelihoods and corresponding remittance transactions are generated overnight, or at certain time intervals. In other instances, the predictive modeling module 136 can apply the model during an online mode of the data exchange analysis system 142, such that the predictive likelihoods and corresponding remittance transactions are generated as a client device 102 communicates with the data exchange analysis system 142. The predictive modeling module 136 can use the aforementioned data from the user profile 146 and the remittance data 157 to generate a predicted likelihood that a user corresponding to the client device 102 will execute a particular transaction. In some instances, the predicted likelihood for a particular transaction can be generated before receiving any indication that the user requests to execute a particular remittance transaction.

By applying the model, the predictive modeling module 136 generates one or more predicted likelihoods and corresponding remittance transactions. For example, the predictive modeling module 136 applies data from the financial data 148, the transaction history 150, the historical exchange rates 158, the locational data 160, and the previous currency transactions 162 to the model trainer to apply to the neural network model. In response, the neural network produces a predicted likelihood 156 and a corresponding transaction that indicates how likely a user is to execute the corresponding transaction at his or her next request. In some instances, the neural network model can produce a predicted likelihood and a corresponding remittance transaction for each data set provided to the model trainer. The data set can include one exchange rate corresponding to one previous transaction, locational data corresponding to that previous transaction, financial data of the user corresponding to the time of the previous transaction, and data of any other currency transactions similar to the previous transaction. The neural network can produce a predicted likelihood, such as 61%, that the user will perform that remittance transaction again.

In other instances, various predicted likelihoods may be associated with certain parameters (e.g., a location at which remittance is requested, a time of day, a time of the month or year, etc.). In response, the predictive modeling module 136 can compare the predicted likelihood to a predetermined threshold, and if above the threshold, store the generated predicted likelihood and corresponding transaction in the predicted likelihoods 156 corresponding to the user profile 146. The neural network model can perform generating a predicted likelihood for each previous currency transaction 162 and store the result of the neural network model in the predicted likelihoods 156. In other instances, the predictive modeling module 136 can provide the financial data 148, the transaction history 150, the historical exchange rates 158, the locational data 160, and the previous currency transactions 162 to the model trainer to apply to the neural network model to generate a set of results. The set of results can be multiple remittance transactions and a predicted likelihood corresponding to each transaction from the multiple remittance transactions. For example, the set of results can be transaction A—72%, transaction B—70%, transaction C—50%, transaction D—40%, and transaction E—30%. The predictive modeling module 136 can store the set of results in the predicted likelihoods 156. In some instances, the predictive modeling module 136 can generate the data using the neural network model to store in the predicted likelihoods 156 in response to turning on the data exchange analysis system 142. In other instances, the predictive modeling module 136 uses the neural network model to store in the predicted likelihoods 156 in response to receiving an indication from the client device 102 to view remittance data.

In response to receiving a request from the client device 102 to request remittance data, the predictive modeling module 136 provides at least one remittance transaction selected from the predicted likelihoods 156 to the user interface engine 138. The predictive modeling module 136 can select a remittance transaction corresponding to the top predicted likelihood stored in the predicted likelihoods 156. In some instances, the predictive modeling module 136 can select a set of remittance transactions corresponding to predicted likelihoods that are greater than a predetermined threshold, such as 65%, to provide to the user interface engine 138. In those instances, the set of remittance transactions presented may also be limited by a total or max number allowed to be presented.

The user interface engine 138 generates a user interface (UI) data to provide to the client device 102. The UI data includes the selected remittance transaction from the predicted likelihoods 156 and other data, such as current exchange rate data, and a timeframe for allowing the user to select the remittance transaction to execute. In particular, the timeframe is set to ensure that the exchange rate stays locked for a particular remittance transaction until the timeframe elapses. Exchange rates can change at various points in time which causes the remittance transaction to require a new source amount and a new destination amount. Before the user interface engine 138 generates the graphics data, the user interface engine 138 ensures the user from the user profile 146 has sufficient funds in his bank account (e.g., in the financial data 148) to support the generated remittance transaction. If the user does not have sufficient funds in his bank account, then the user interface engine 138 provides a request to the predictive modeling module 136 for the next subsequent remittance transaction from the predicted likelihoods 156. Once the remittance transaction meets the threshold of sufficient funds in the user profile 146's financial data 148, the user interface engine 138 generates the graphics data. The graphics data can include a UI element (e.g., a button) that allows the user at the client device 102 to interact with to execute the selected remittance transaction. The graphics data can include other data associated with the selected remittance transaction, such as, for example, a source location, a destination location, a money amount transferring from the source location, a money amount transferring to the destination location, a current exchange rate that is locked in place, the time period the current exchange rate is locked in place, a current time, and a current balance of the user's financial data. In some instances, the remittance transaction can be associated with a foreign currency exchange transaction. The foreign currency exchange transaction can be associated with executing a transaction from one foreign country to another. In other instances, the remittance transaction can be associated with a digital currency exchange transaction. For example, the digital currency exchange transaction can be a currency such as BITCOIN or ETHEREUM.

Once the user interface engine 138 generates the graphics data, the user interface engine 138 transmits the graphics data to the client device 102 for the user's display. At the client device 102, the user can either select the UI element (e.g., the button) to execute the generated remittance transaction or close the page showing the UI element and the data corresponding to the generated remittance transaction.

If the user selects the UI element (e.g., the button) on the client device 102 to execute the remittance transaction, the backend conversational interface 129 and/or the analytics engine 132 receives an indication from the client device 102 to execute the remittance transaction. The backend conversational interface 129 transmits a notification to the financial engine 140 to execute the remittance transaction. In particular, the notification includes data corresponding to the remittance transaction, the user corresponding to the remittance transaction, and the financial data corresponding to the remittance information. In some instances, the financial engine 140 determines if the exchange rate for the remittance transaction has changed from a previously presented exchange rate in the data provided to the client device 102. In particular, the financial engine 140 compares the exchange rate for the selected and initiated remittance transaction to a current exchange rate for the remittance transaction to determine if a change has occurred. This is of particular importance where prior remittance information has changed, or where a grace or lock period after obtaining the information previously has expired. If the financial engine 140 determines a change has occurred, then the financial engine 140 transmits a notification to the client device 102 indicating that the exchange rate for the selected remittance transaction has changed and requests approval from the user for executing the remittance transaction with the new exchange rate. If the user approves, the user can indicate his or her approval on the client device 102, and the client device 102 will transmit an indication to the data exchange analysis system 142 indicating to proceed with executing the remittance transaction with the new exchange rate.

In response to the financial engine 140 receiving the indication to execute the remittance transaction, the financial engine 140 executes the remittance transaction based on the parameters associated with the selected remittance transaction and stores an indication of the execution of the remittance transaction in the previous currency transactions 162.

In addition, the financial engine 140 may use the payment network(s) 124 and a particular eCommerce site 126 to execute the remittance transaction. The financial engine 140 can determine which eCommerce site 126 to choose from the user's user-specific rules 154 corresponding to the user profile 146, or based on information provided in or associated with the selected remittance transaction. In particular, the financial engine 140 also evaluates options corresponding to different eCommerce sites 126 and different payment systems. Different eCommerce sites 126 and different payment systems can provide improved payment rates and taxes that can affect the overall remittance transaction cost for the user. In particular, the financial engine 140 can analyze the transaction costs from each eCommerce site 126 and each of the different payment sites to determine which offers the lowest transaction fee and lowest taxes for performing the remittance transaction. The financial engine 140 can transmit a notification to the client device 102 indicating an analysis of the costs that includes the foreign exchange and transaction fees, as well as a preference for a particular payment channel (e.g., an eCommerce site 126 or a payment network). The financial engine 140's preference for the particular payment channel can be based on the overall cost for performing the remittance transaction for the user, the amount of time required for the particular payment channel to transmit the remittance transaction, a rating of the payment channel by one or more other users, and a reliability of the particular payment channel for ensuring secure transactions. Additionally, the financial engine 140 can show the user on his or her client device 102 a ranking of particular payment channels for the user to select, with the top ranked payment channel being the payment channel preferred by the financial engine 140. The client device 102 can transmit an indication of the selected payment channel to the data exchange analysis server 142 from the user's selection, which provides the indication of the selected payment channel to the financial engine 140. In response, the financial engine 140 can use the selected payment channel to execute the remittance transaction. In some instances, the financial engine 140 can automatically select the preferred payment channel without receiving a selection from the user. The user can store in his or her user-specific rules 154 a preference that indicates to the financial engine 140 to automatically select the preferred payment channel or requests for an indication to be provided to the user's client device 102 to allow the user to select the payment channel for the financial engine 140 to use for executing the remittance transaction. In some instances, the user-specific rules 154 can indicate to the financial engine 140 to automatically post the payment to the social network of the user to the corresponding recipient.

Additionally, the financial engine 140 can retrieve an amount of money to deliver in a first currency from a bank account in the financial data 148 of the user profile 146 for the remittance transaction. Once the financial engine 140 transfers the amount of money in the first currency for the remittance transaction using the selected payment channel, the financial engine 140 stores a receipt of the delivered remittance transaction and a timestamp in the previous currency transactions 162. The receipt can include an indication of a money amount retrieved from the bank account of the user in a first currency, the received money amount in the second currency, a source location, a location of the destination, an exchange rate at the time of delivery, and the particular channel, payment network, and/or eCommerce site 126 through which the remittance transaction is performed.

As illustrated, the memory 144 includes a single memory or multiple memories. The memory 144 may include any type of memory or database module and may take the form of volatile and/or non-volatile memory including, without limitation, magnetic media, optical media, random access memory (RAM), read-only memory (ROM), removable media, or any other suitable local or remote memory component. The memory 144 may store various objects or data, include caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the data exchange analysis system 142. Additionally, the memory 144 may store any other appropriate data, such as VPN applications, firmware logs and policies, firewall policies, a security or access log, print or other reporting files, as well as others. As illustrated, memory 144 includes, for example, user profile 146 and remittance data 157, described herein. Memory 144 may be local to or remote to the data exchange analysis system 142, and may be available remotely via network 122 or an alternative connection in such instances where not locally available. Further, some or all of the data in memory 144 in FIG. 1 may be located outside of the data exchange analysis system 142, including within network 122 as cloud-based storage and data.

Illustrated system 100 includes at least one client device 102, and may include a plurality of client devices 102 in some instances. Each client device 102 may generally be any computing device operable to connect to or communicate within the system 100 via network 122 using a wireline or wireless connection. In general, the client device 102 comprises an electronic computer device operable to receive, transmit, process, and store any appropriate data associated with the system 100 of FIG. 1. As illustrated, the client device 102 can include one or more client applications, including the client application 110 and the digital assistant 114. In some instances, the digital assistant 114 may be a part of the operating system executing on the client device 102, or may be a standalone application or client-side agent of a backend application. In some instances, the client device 102 may comprise a device that includes one or more input(s) 116, such as a keypad, touch screen, camera, or other device(s) that can interact with the client application 110 and/or digital assistant 114 and other functionality, and one or more output(s) 118 that convey information associated with the operation of the applications and their application windows to the user of the client device 102. The output(s) 118 can include a display, speakers, or any other suitable output component. The information presented by the output(s) can include digital data, visual information, auditory output, or a graphical user interface (GUI) 108, as shown with respect to the client device 102. In general, client device 102 includes an electronic computer device operable to receive, transmit, process, and store any appropriate data associated with the environment 100 of FIG. 1.

Client application 110 can be any type of application that allows the client device 102 to request and view content on the client device 102. In some instances, client application 110 may correspond with one or more backend appliances or functionality, including an application or platform associated with the data exchange analysis system 142. In some instances, the client application 110 can be associated with a client-side version of the conversational interface 112, where the client-side version of the conversational interface 112 can represent a tool for users to provide inputs to the backend conversational interface 129 and receive the remittance data from the data exchange analysis system 149 of the same for viewing at the client device 102.

In many instances, the client device 102 may be a mobile device, including but not limited to, a smartphone, a tablet computing device, a laptop/notebook computer, a smartwatch, or any other suitable device capable of interacting with the data exchange analysis system 142 and the backend conversational interface 129. One or more additional client applications 110 may be present on a client device 102, and can provide varying functionality for users. In some instances, client application 110 may be a web browser, mobile application, cloud-based application, or dedicated remote application or software capable of interacting with at least some of the illustrated systems via network 122 to request information from and/or respond to one or more of those systems. In some instances, requests for remittance may be submitted using the client application 110 alone, and may not include a conversational interface 112.

The digital assistant 114 may be any interactive artificial or virtual intelligence component, agent, or other functionality that can be interacted with by a user, either textually or verbally through one or more input(s) 116 (e.g., a microphone), manually through one or more input(s) 116 (e.g., physical or virtual keyboards, touch screen buttons or controls, other physical or virtual buttons, etc.), or through captured gestures or movements identified by the client device 102. In general, the digital assistant 114 may be a software agent, module, or component, among others, that can perform tasks or services for an individual in response to one or more inputs, and can include or represent a particular conversational interface 112 associated with the backend conversational interface 129. As indicated, any one of numerous commercial examples may be used, as well as other proprietary or application-specific assistants. The digital assistant 114 may work and interact via text (e.g., chat), voice, image submission, or other suitable inputs. Some virtual assistants can interpret input using natural language processing (NLP) to match user text or voice input to executable commands. In some instances, the digital assistant 114 can be interacted with to initiate and perform one or more input and response interactions described herein. In some instances, the digital assistant 114 may be a standalone application (e.g., Google Assistant executing on an iPhone), functionality included in a particular application used for other purposes (e.g., an Alexa-enabled Amazon app), or an agent or other functionality built into the operating system (e.g., Siri on Apple's iOS).

As illustrated, the client device 102 may also include an interface 104 for communication (similar to or different from interface 128), a processor 106 (similar to or different from processor 130), memory 120 (similar to or different from memory 144), and GUI 108. GUI 108 can interface with at least a portion of the environment 100 for any suitable purpose, including generating a visual representation of the client application 110 and/or the digital assistant 114, presenting a pop-up or push notification or preview thereof, presenting the UI associated with the conversational interface 112, or any other suitable presentation of information. GUI 108 may also be used to view and interact with various Web pages, applications, and Web services located local or external to the client device 102, as well as information relevant to the client application 110. Generally, the GUI 108 provides the user with an efficient and user-friendly presentation of data provided by or communicated within the system. The GUI 108 may comprise a plurality of customizable frames or views having interactive fields, pull-down lists, and buttons operated by the user. For example, the GUI 108 may provide interactive elements that allow a user to view or interact with information related to the operations of processes associated with the data exchange analysis system 142 and any associated systems, among others. In general, the GUI 108 is often configurable, supports a combination of tables and graphs (bar, line, pie, status dials, etc.), and is able to build real-time portals, application windows, and presentations. Therefore, the GUI 108 contemplates any suitable graphical user interface, such as a combination of a generic web browser, a web-enabled application, intelligent engine, and command line interface (CLI) that processes information in the platform and efficiently presents the results to the user visually.

As illustrated, the memory further includes a historical remittance selection data 121. The historical remittance selection data 121 can be selections stored in memory that indicate the user previously selected to execute one or more remittance transactions. In particular, the selections in the historical remittance selection data 121 can include a timestamp for when the user selected to execute the remittance transaction, a source of the remittance transaction, a destination of the remittance transaction, a money amount transferred from the source, a money amount transferred to the destination, an exchange rate corresponding to the transaction when the user executed the remittance transaction, and data identifying the user that executed the remittance transaction. The client device 102 can transmit the data from the historical remittance selection 121 to the data exchange analysis system 142 at various instances. For example, the client device 102 can transmit the data from the historical remittance selection 121 to the data exchange analysis system 142 each time the user requests for subsequent remittance data; when the user selects another remittance transaction to execute; and, when the data exchange analysis system 142 requests for remittance data from the client device 102.

The payment network(s) 124 can be one or more financial networks used to make remittance transactions. For instance, the payment network(s) 124 can be one or more banks, financial institutions, point-of-sale terminal, ATM, source device, destination device, credit and debit cards corresponding to each of the source device and the destination device.

The eCommerce sites 126 can be one or more financial web sites to perform a remittance transaction. For example, the eCommerce sites 126 can include TD Bank, Amazon, Taobao, Ebay, and BestBuy to name a few examples. The eCommerce sites 126 can be any first or third party site or interface through which one or more remittance transactions can be performed. Different eCommerce sites 126 may have or may provide different foreign exchange fees at certain times, different processing fees in addition to the exchange rates, and other factors that can be considered by the analytics engine 132. The data exchange analysis system 142 can provide a link or reference to the client device 102 for the user to access the eCommerce site to perform a remittance transaction.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
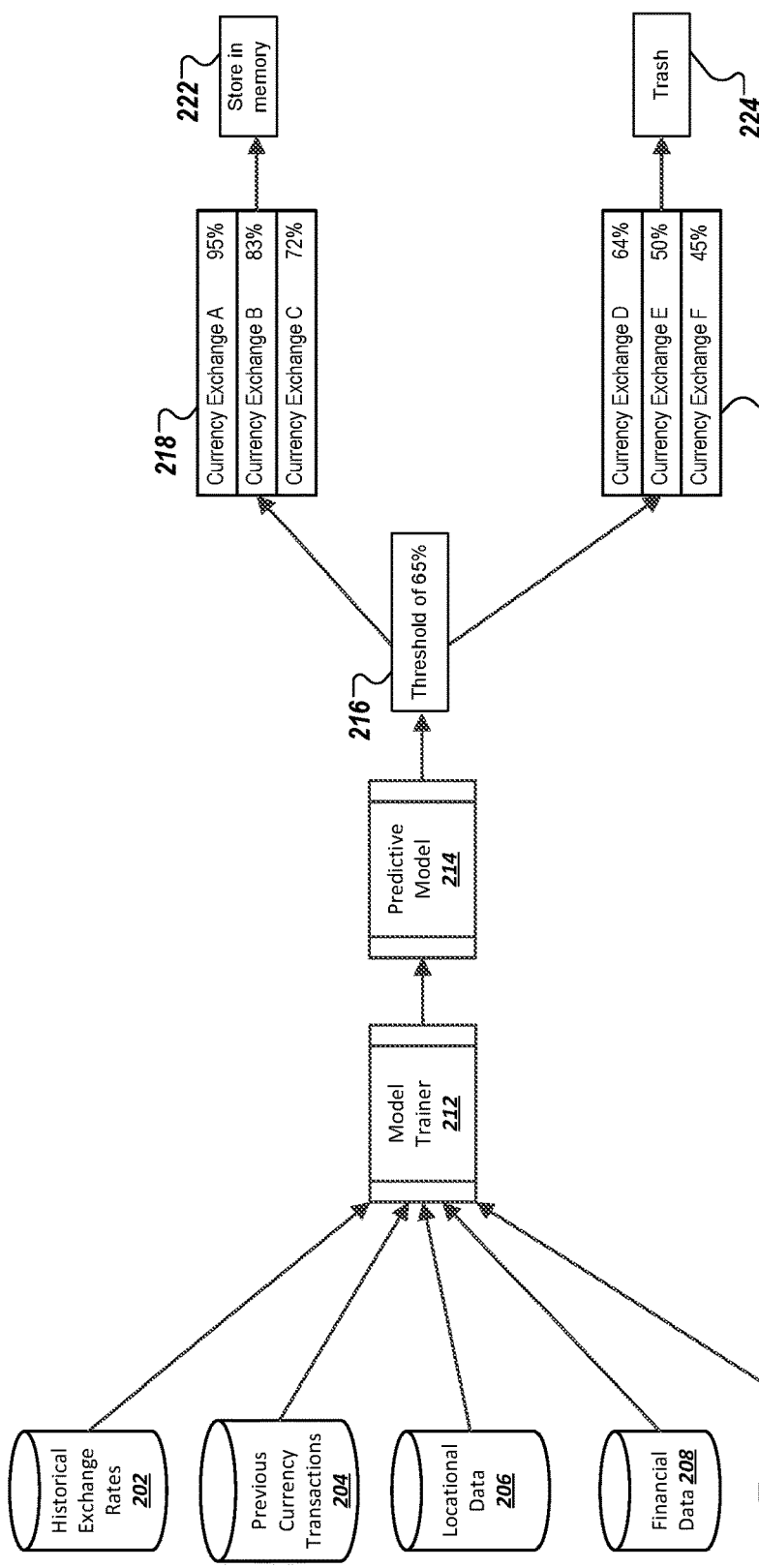
FIG. 2 is a block diagram illustrating an example system for generating a predicted likelihood of a user executing a particular remittance transaction using a classification model in one implementation.

FIG. 2 is a block diagram illustrating an example system 200 for generating a predicted likelihood of a user executing a particular remittance transaction using a classification model, in one implementation. The system 200 illustrates a model trainer applying the neural network model to generate the predicted likelihood corresponding to the particular remittance transaction, where the particular remittance transaction includes a specific context (for example, a time and/or a location at which the request is associated). In particular, the model trainer 212 in the predictive modeling module 136 retrieves data from historical exchange rates 202, previous currency transactions 204, locational data 206, financial data 208, and other currency transactions 210 to provide to the predictive model 214.

The model trainer 212 may apply a set of data from each of the historical exchange rates 202, previous currency transactions 204, locational data 206, financial data 208, and other currency transactions 210 to generate a predicted likelihood for a particular remittance transaction. For example, the predictive model 214 may produce a predicted likelihood of 95% for a currency exchange transaction A. The currency exchange transaction A can be, for example, a transaction of $1000 from Canada to $654.69 Euro for a user located in Canada transferring to a user located in Great Britain with a predicted likelihood of 95%. The predictive modeling module 136 can compare the predicted likelihood to a threshold 216 to determine whether to store the predicted likelihood in memory or delete the generated predicted likelihood and corresponding remittance transaction. Since the predicted likelihood of 95% corresponding to the currency exchange transaction A is greater than the threshold of 65% 216, the predictive modeling module 136 stores the currency exchange transaction A and corresponding predicted likelihood of 95% in memory 222. Alternatively, the predictive model 214 may generate a set of predicted likelihoods for a set of currency exchange transactions. For example, the predictive model 214 can generate a set of predicted likelihoods for the set of currency exchange transactions, such, as for example, the data set 218 that includes currency exchange transaction A and corresponding predicted likelihood of 95%, currency exchange transaction B and corresponding predicted likelihood of 83%, and currency exchange transaction C and corresponding predicted likelihood of 72%. Since the corresponding predicted likelihoods of each of these transactions is greater than the threshold of 65%, the predictive modeling module 136 stores the data set in memory 222. Likewise, the data set 220 includes currency exchange transaction D and corresponding predicted likelihood of 64%, currency exchange transaction E and corresponding predicted likelihood of 50%, and currency exchange transaction F and corresponding predicted likelihood of 45%. Each of the predicted likelihoods in the data set 220 is less than the threshold of 65% 216. Thus, the predictive modeling module 136 proceeds to erase the data set 220 in trash 224.

Figure 3:
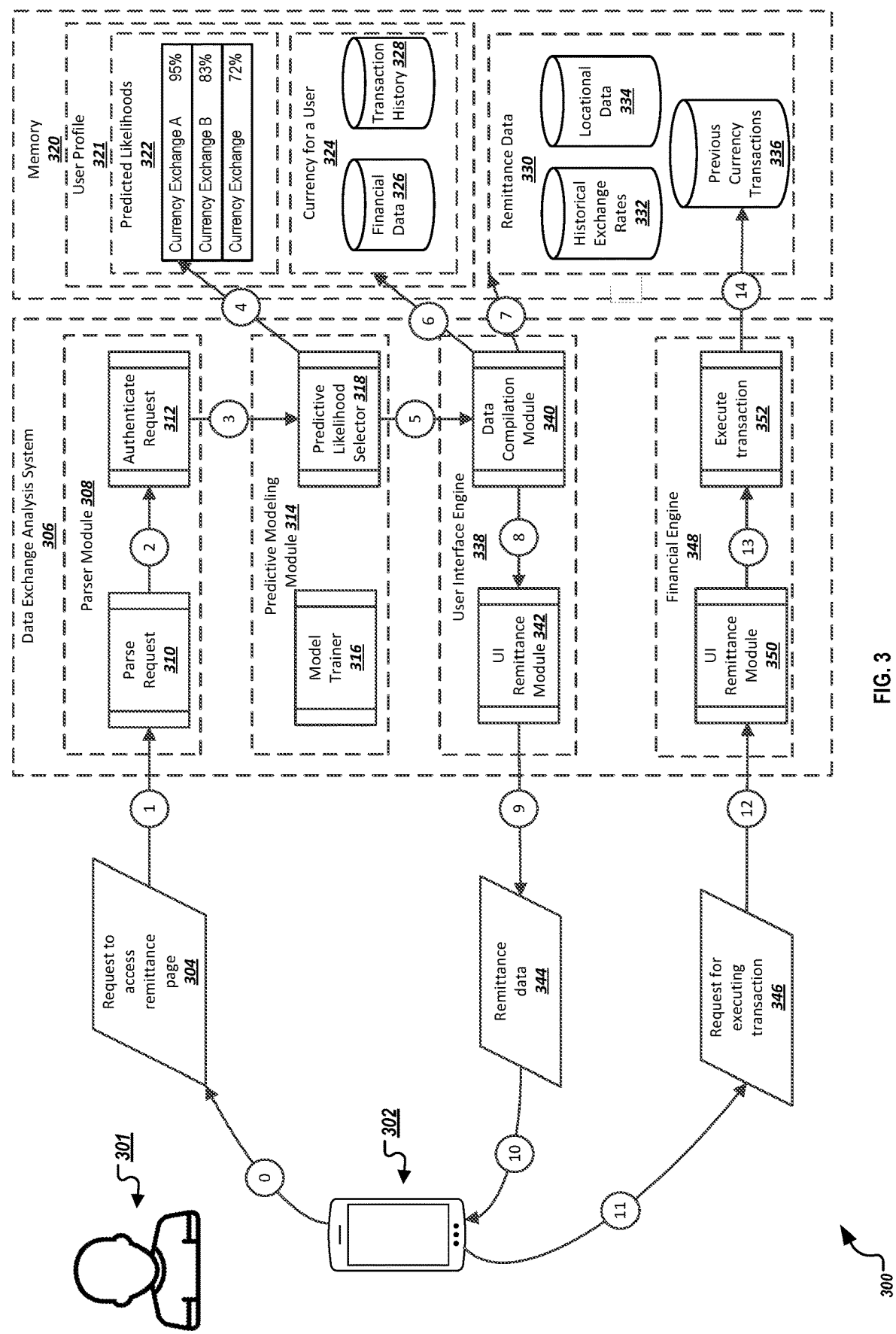
FIG. 3 is a data and control flow of example interactions performed by a remittance system that provides a remittance transaction based on a predicted likelihood of a user executing the remittance transaction in one implementation.

FIG. 3 is a data and control flow of example interactions performed by a remittance system 300 that provides a remittance transaction based on a predicted likelihood of a user executing the remittance transaction. The diagram provides an example set of operations and interactions to receive a request to access a remittance page, determine an intent of the request, authenticate the user based on the received request, identify a predicted likelihood corresponding to a currency exchange transaction stored in memory, generate user interface data that includes the identified currency exchange transaction and other financial data corresponding to the user, transmit the user interface data to the client device of the user, receive an indication from the user to execute the currency exchange transaction, and execute the currency exchange transaction. In particular, a user 301 interacts with a conversational interface (or client device at which a user 301 is interacting with the conversational interface or a client application via a user interface) that interacts with a data exchange analysis system (including a parser module 308, a predictive modeling module 314, a user interface engine 338, and a financial engine 348), and memory 320 (including user profile 321 and remittance data 330). These components may be similar to or different from the components described in FIG. 1.

As illustrated, the user 301 interacts with a client device 302 to provide a request or user input 304 to the data exchange analysis system 306 (0). In particular, the user input 304 is provided or transferred to the parse request module 310 of the parser module 308 to determine an intent of the request (1). The parse request module 310 analyzes the request to access remittance page 304 from the client device 102. In particular, the request can include the notification from the user to instruct the data exchange analysis system to perform a remittance transaction. In another example, the request 304 may include a notification to access a particular webpage or application that allows a user to request financial data from his or her one or more financial accounts. In another example, the request 304 may include a notification to access a particular webpage or application that allows a user to perform one or more remittance transactions based on previous remittance transactions. The parse request module 310 also determines which user and from which client device the request was 304 was transmitted from. The parse request module 310 provides the data from the input 304 to the authenticate request module 312 (2).

The authenticate request module 312 can use the data retrieved by the parse request module 310 to identify and/or verify the credentials of the user that transmitted the request 304. In particular, the parse request module 310 can compare one or more credentials retrieved from the request 304 to one or more credentials stored in a corresponding user profile 321. Once the authenticate request module 312 determines a match exists between the one or more credentials in the received input to one or more credentials found in a particular user profile 321, the authenticate request module 312 provides data identifying a user that transmitted the request 304 to a predictive likelihood selector 318 of the predictive modeling module 314 (3). The model trainer 316 in the predictive modeling module 314 is used for training the classification model and applying the classification model to generate predicted likelihoods corresponding to transactions. The data identifying the user that transmitted the request 304 can include a generated credential of the user that verifies the credentials of the user and data of the received request 304.

The predictive likelihood selector 318 can use the generated credential of the user provided by the authenticated request module 312 to access a corresponding user profile 321 in the memory 320 (4). In particular, the generated credential of the user can act as an index to access the corresponding user profile 321 in memory 320. From the accessed user profile, the predictive likelihood selector 318 can access the predicted likelihoods 322 of the corresponding user profile 321. The predicted likelihoods 322 of the corresponding user profile 321 illustrate the currency exchange transactions and corresponding predicted likelihoods that the user, associated with the user profile 321, is likely to select in response to the data exchange analysis system 306 receiving the request 304. In some instances, the predictive likelihood selector 318 retrieves the transaction with the greatest predicted likelihood. In other instances, the predictive likelihood selector 318 retrieves a top set of transactions with predicted likelihoods above a predetermined threshold.

The predictive likelihood selector 318 transmits the selected predicted likelihood and corresponding currency exchange transaction to the data compilation module 340 in the user interface engine (5). The data compilation module 340 uses the selected predicted likelihood and the corresponding currency exchange transaction to assist in gathering other financial data corresponding to the user 301. In particular, the data compilation module 340 retrieves financial data corresponding to the user from the currency for a user 324 in the user profile 321 (6). The data compilation module 340 retrieves data from financial data 326 and the transaction history 328. From the financial data 326, the data compilation module 340 retrieves data to determine whether the user 301 contains sufficient funds in his bank account to execute the currency exchange transaction corresponding to the selected currency exchange transaction. Additionally, the data compilation module 340 retrieves a remaining amount in the user 301's bank account to display to the user on the client device 302.

The data compilation module 340 also retrieves data from the remittance data 330 (7). The remittance data 330 includes historical exchange rates 332, locational data 334, and previous currency transactions 336. The data compilation module 340 retrieves locational data of the user, locational data of the source portion of the transaction (e.g., which may be the same as the locational data of the user), and locational data of the destination portion of the transaction for the recipient from the locational data 334. The data compilation module 340 retrieves an exchange rate for the selected currency exchange transaction from the historical exchange rates 332 to provide to the user 301. In addition, the data compilation module 340 can compare transaction fees and taxes for the user 301 from different payment networks and eCommerce sites to provide one or more preferred payment networks to the user 301 for review along with the exchange rate. The data compilation module 340 can generate one or more preferred payment channels from the different payment networks and eCommerce sites that offer the user 301 the overall lowest cost for performing the remittance transaction. In some instances, the data compilation module 340 can select its preferred payment channel. The data compilation module 340 provides the data retrieved from the currency for a user 324, data regarding the one or more preferred payment channels, and data retrieved from the remittance data 330 to the user interface (UI) remittance module 342 in the UI engine 338 (8).

The UI remittance module 342 generates user interface (UI) data to provide to the client device 102. The UI data includes the selected remittance transaction from the predicted likelihoods 322 and other data, such as current exchange rate data from the historical exchange rates 332, a timeframe for allowing the user to select the remittance transaction to execute before the current exchange rate changes, data associated with the selected remittance transaction, such as, for example, a source location for the transaction, a destination location for the transaction of the recipient, a money amount transferring from the source location in a first currency, a money amount transferring to the destination location in a second currency, a current time, and a current balance of the user's financial data. The graphics data can also include a user interactive button (e.g., a button, slider, or selector) that allows the user at the client device 302 to interact with to execute the selected remittance transaction when the user opens the client application 110. In some instances, upon the user 301 opening client application 110 on the client device 302, the client application 110 can send the request 304 to the data exchange analysis system 306 to request for remittance data. In other instances, the user 301 can request for remittance transaction after the client application 110 opens on the client device 302. Once the UI remittance module 342 generates the graphics data, the UI remittance module 342 can transmit the remittance data 344 to the client device 302 (9). The client device 302 receives the remittance data 344 and processes the remittance data 344 with client application 110 (10). At the client device 302, the user 301 has the option to execute the currency exchange transaction associated with the user interactive button or to close the client application 110.

In response to the user 301 selecting the user interactive button that indicates to execute the currency exchange transaction, the client device 302 transmits a request for executing transaction 346 to the data exchange analysis system 306 (11). The client device 302 can transmit the request for executing the transaction 346 over the network 122. The data exchange analysis system 306 can provide the request for executing the transaction 346 to the financial engine 348 to the UI remittance module 350 (12). The UI remittance module 350 compares the exchange rate for the remittance transaction to a current exchange rate for the remittance transaction to determine if a change has occurred. If the UI remittance module 350 determines a change has occurred, then the UI remittance module 350 provides a notification to the client device 302 indicating that the exchange rate for the selected remittance transaction has changed and requests approval from the user for executing the remittance transaction with the new exchange rate. If the user 301 approves, the user 301 can indicate his or her approval on the client device 302, and the client device 102 will transmit an indication to the data exchange analysis system 142 indicating to proceed with executing the remittance transaction with the new exchange rate. The UI remittance module 350 transmits the request for executing the transaction 346 to the execute transaction module 352 in the financial engine 348 (13).

The execute transaction module 352 executes the remittance transaction corresponding to the selected currency exchange transaction indicated by the user 301. The execute transaction module 352 can use one or more payment network(s) 124 and a particular eCommerce site 126 to execute the remittance transaction. In some instances, the execute transaction module 352 may use one or more payment network(s) 124 and may not use any additional eCommerce sites 126, besides its own financial transaction website to perform the remittance transaction. After the execute transaction module 352 performs the remittance transaction, the execute transaction module 352 stores an indication of the executed transaction in the previous currency transactions 336 (14).

Figure 4A:
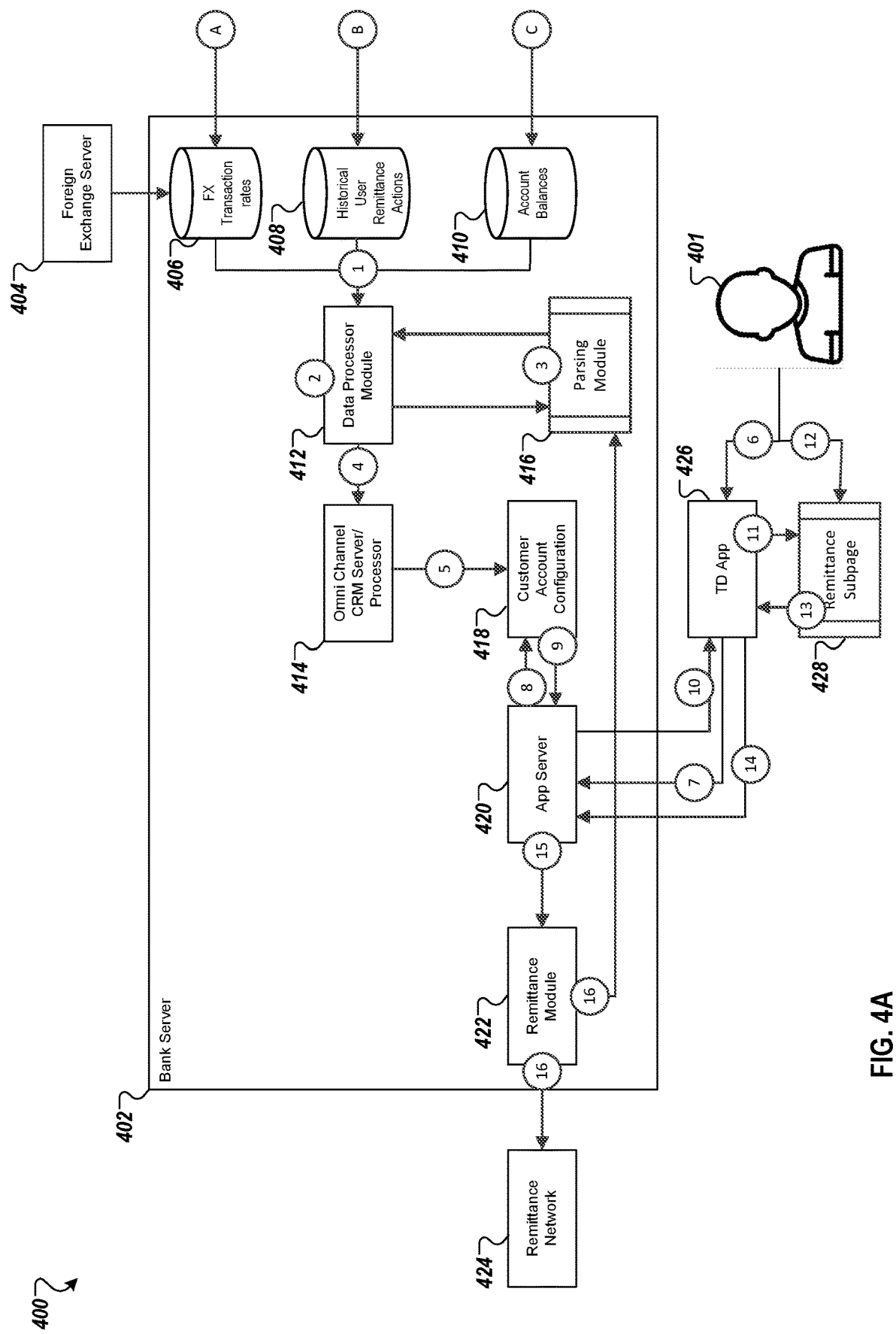
FIG. 4A is a block diagram illustrating an example system of a remittance system for providing a remittance transaction based on a predicted likelihood of a user executing the remittance transaction in one implementation.

FIG. 4A is another block diagram illustrating an example system 400 of a remittance system for providing a remittance transaction based on a predicted likelihood of a user executing the remittance transaction. The system 400 includes a bank server 402, a foreign exchange server 404, a remittance network 434, a TD application 426 and a remittance subpage 428. The bank server 402 includes a foreign exchange (FX) transaction rates database 406, a historical user remittance actions database 408, an account balances database 410, a parsing module 416, a customer account configuration module 418, an application server 420, and a remittance module 422.

As illustrated in system 400, at least two different data sources are published to a data processor module 412 (1). For example, the data sources may contain the following information: historical user remittance behavior from the historical user remittance actions database 408 and the foreign exchange rates from the FX transaction rates database 406. Additionally, the data sources may include data corresponding to the user from the account balance database 410. In particular, foreign exchange rates from the FX transaction rates database 406 includes an exchange rate from a first country to a second country and a time the exchange rate is set. The historical user remittance behavior from the historical remittance actions database 408 can include the currency type transmitted, the currency type received, an identifier for the user that initiated the currency transaction, an amount of money sent in a first currency, and an amount received in a second currency, and a time the currency was transmitted. Additionally, the data from the account balance database 410 can include a user identifier, an account balance corresponding to the user, and a time the money was retrieved from the account balance. In some instances, the data sources of the FX transaction rates database 406, a historical user remittance actions database 408, and an account balances database 410 need not be held on separate servers by may all be held on the same server. The data from each the data sources may be combined using one or more keys such as a user identifier and currency through extraction, transformation, and loads methods.

Once the data is published to the data processor module 412, the data processor module 412 is prompted to parse the historical transaction data from the historical user remittance actions database 408 (2). The data processor module 412 parses the historical transaction data from the user 401 to determine an amount of money user 401 has sent in the past that they may repeat sending. In response, the data processor module 412 transfers the parsed historical transaction data to the parsing module 416 (3).

The parsing module 416 parses the received data and returns to the data processor module 412 a list of locations and corresponding dollar amounts that may be sent to each of those locations in that locations currency. Additionally, the parsing module 416 provides the amount that it would cost the user 401 in his/her local currency to execute those transactions. In some instances, the parsing module 416 can utilize a classification model to determine the most likely amount the user will transmit to various locations. The classification model can be trained at least in part on the data from the historical user remittance actions database 408. In some instances, the classification model can utilize one or more logic rules to segment the data into a single user centric information source and also may be used to feature engineered data that can include, for example, "a last amount sent to a location A." Generally speaking, for a single user, sending money to a single international location of a single amount to a single account from a previous transaction. In order for the bank server 402 to execute the classification model, the system can analyze an average period between money transfers, moving average of foreign transaction rates over a period of time, and an account balance. The classification model can include multinomial logit models, decision tree models, neural network models, or the like, or can include numerical models, such as regression models, and probability models.

The data processor module 412 then transmits the user customized foreign exchange data from the parsing module 416 to the omni-channel CRM module 414 (or any module that can manage a customer account user interface) (4). In response to the CRM module 414 receiving the data, the CRM module integrates the received data into the customer's account configuration such that when the customer accesses their remittance account for international remittance, the data can be used to improve the customer experience (5). This data can be stored in memory.

A user 401 provides a request to the application 426 to access a remittance page on the user 401's application 426 (6). The communication module in the user 401's client device holding the application 426 transmits a request to the application server 420 (7). The application server 420 transmits a request to the customer account configuration module 418 requesting the customer account information from the received request from the user 401 (8). The application server 420 then retrieves the requested customer account information (including the one or more remittance transactions previously generated) from the customer account configuration module 418 (9). In response, the application server 420 relays customer account information to the application 426 on the client device of the user 401 (10). The application 426 then displays a remittance page to the user 401 (11). The remittance page displays the customized FX transaction data prepopulated on the page along with a selectable UI feature, which a customer can select and upon being selected, indicates to the application server 420 to execute the customized FX transaction according to the data provided in the customized FX transaction data. In some instances, the customized FX transaction data is used to provision an international remittance transaction and a selectable feature on a user interface, which a customer can select and upon being selected, execute the FX transaction according to the data in the FX transaction. The amount being sent, the amount to be received, and a balance for the user 401 may be also be displayed on the remittance page.

The user 401 selects the selectable feature to execute the FX transaction to provide to the remittance module (12). In response to receiving the indication that the user 401 selected the feature to execute the FX transaction, the selection is relayed to the application 426 to execute the FX transaction (13). In response to the application 426 receiving the instruction, the application 426 relays the execution instruction to the application server 420 (14). The application server 420 relays the execution instruction to the remittance module 422 to execute the FX transaction (15). The remittance module 422 executes the transaction and records a receipt of the executed transaction on the customer account (16). In particular, the transaction is transmitted to the remittance network 424 to be executed.

As illustrated, FX transaction rates database 406 connects to connector A; historical user remittance actions database 408 connects to connector B; and, account balances database 410 connects to connector C. Each of these connectors A, B, and C in FIG. 4A illustrate the connections to the corresponding A, B, and C connectors shown in FIG. 4B.

Figure 4B:
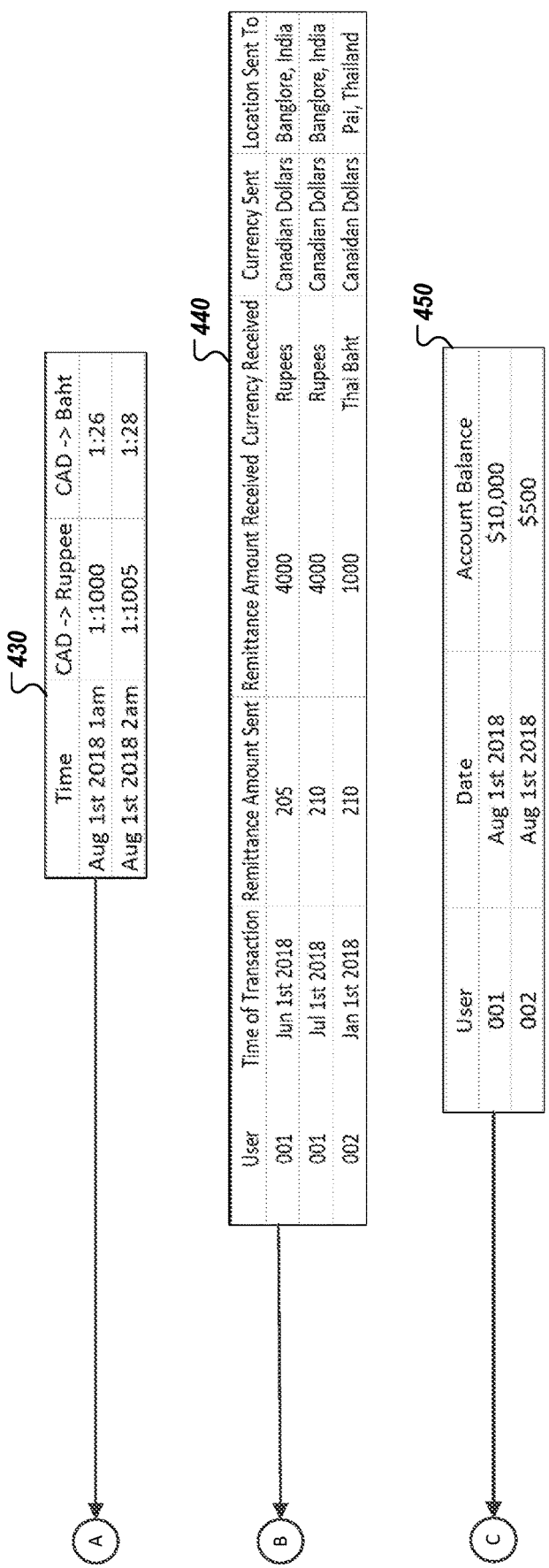
FIG. 4B is another block diagram illustrating an example system of data included in the databases of the bank server as shown in FIG. 4A.

FIG. 4B is another block diagram illustrating an example system of data included in the databases of the bank server 402 as shown in FIG. 4A. FIG. 4B illustrates a database 430 for the FX transaction rates 406 as connected to connector A. The database 430 illustrates a time for a transaction, an exchange rate from Canadian Dollar to Indian Rupee and an exchange rate from Canadian Dollar to Baht. FIG. 4B also illustrates database 440 for the historical user remittance actions 408 as connected to connector B. The database 440 illustrates a user ID, a time of transaction, a remittance amount sent, a remittance amount received, a currency received, a currency sent, a location of a user initiating the remittance transaction, and a location of the recipient. Additionally, FIG. 4B illustrates a database 450 for the account balances database 410 connected to connector C that includes a user ID, a date, and a corresponding account balance.

Figure 5:
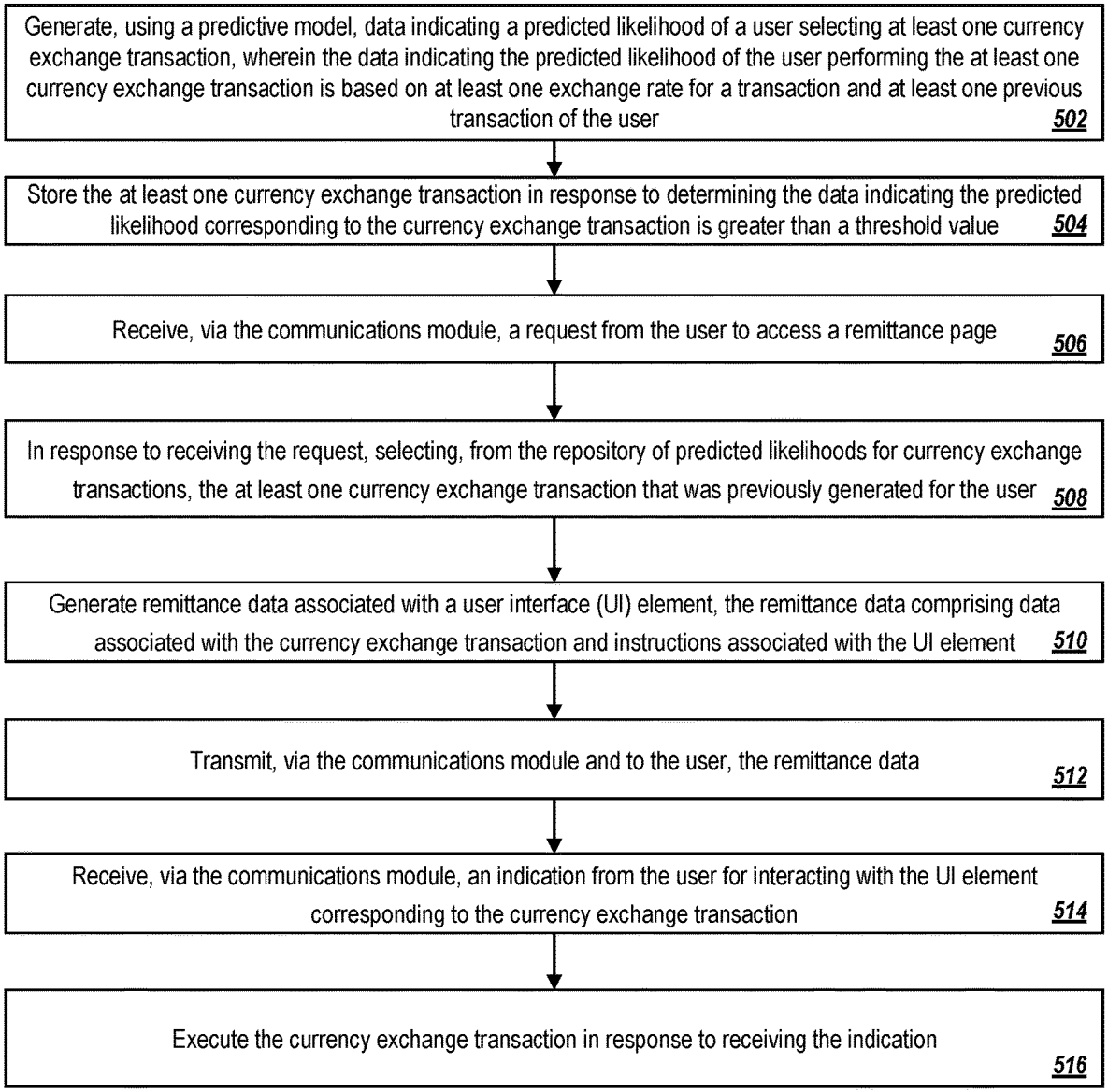
FIG. 5 is a flowchart of an example method performed at a data exchange analysis server in connection with a client device for providing a remittance transaction based on a predicted likelihood of a user executing the remittance transaction in one implementation.

FIG. 5 is a flowchart of an example method performed at a data exchange analysis server in connection with a client device for providing a remittance transaction based on a predicted likelihood of a user executing the remittance transaction. It will be understood that method 500 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 500. In some implementations, the method 500 and related methods are executed by one or more components of the system 100 described above with respect to FIG. 1, or the components described in FIGS. 2-4.

At 502, data indicating a predicted likelihood of a user selecting at least one currency exchange transaction is generated, the data indicating the predicted likelihood of the user performing the at least one currency exchange transaction is based on at least one exchange rate for a transaction and at least one previous transaction of the user. In some instances, a predictive modeling module 136 can generate at least one predictive likelihood for a transaction and at least one previous transaction of the user. In some instances, the predictive modeling module 136 can apply the model during an offline mode of the data exchange analysis system 142, such that the predicted likelihoods and corresponding remittance transactions are generated overnight. In other instances, the predictive modeling module 136 can apply the model during an online mode of the data exchange analysis system 142, such that the predictive likelihoods and corresponding remittance transactions are generated as a client device 102 communicates with the data exchange analysis system 142. The predictive modeling module 136 can use the historical exchange rates, previous currency transactions, locational data, financial data, and data of other currency transactions from the user profile 146 and the remittance data 157 to generate a predicted likelihood that a user corresponding to the client device 102 will execute a particular transaction. In some instances, the predicted likelihood for a particular transaction can be generated before receiving any indication that the user requests to execute a particular remittance transaction.

By applying the model, the predictive modeling module 136 generates one or more predicted likelihoods and corresponding remittance transactions. For example, the predictive modeling module 136 applies data from the financial data 148, the transaction history 150, the historical exchange rates 158, the locational data 160, and the previous currency transactions 162 to the model trainer to apply to the neural network model, for example. In some instances, the predictive modeling module 136 can apply one or more previously generated preferred payment channels to the neural network model to assist with generating one or more predicted likelihoods and corresponding remittance transactions. By providing the preferred payment channels to the neural network model, the neural network model can generate one or more predicted likelihoods that are swayed by the previous selections of the preferred payment channels. For example, if a first predicted likelihood is typically greater than a second predicted likelihood for corresponding transactions, but a payment channel for the transaction corresponding to the second predicted likelihood is preferred over the transaction corresponding to the first predicted likelihood, the neural network can output a higher predicted likelihood for the second transaction over the first transaction. In response, the neural network produces a predicted likelihood and a corresponding transaction that indicates how likely a user is to execute the corresponding transaction at his or her next request. In some instances, the neural network model can produce a predicted likelihood and a corresponding remittance transaction for each data set provided to the model trainer. The data set can include one exchange rate corresponding to one previous transaction, locational data corresponding to that previous transaction, financial data of the user corresponding to the time of the previous transaction, and data of any other currency transactions similar to the previous transaction.

At 504, the at least one currency exchange transaction is stored in response to determining the data indicating the predicted likelihood corresponding to the currency exchange transaction is greater than a threshold value. In response to generating the predicted likelihood for a corresponding transaction, the predictive modeling module 136 can compare the predicted likelihood to a predetermined threshold, and if above the threshold, store the generated predicted likelihood and corresponding transaction in the predicted likelihoods 156 corresponding to the user profile 146. The neural network model can perform generating a predicted likelihood for each previous currency transaction 162 and store the result of the neural network model in the predicted likelihoods 156. In other instances, the predictive modeling module 136 can provide the financial data 148, the transaction history 150, the historical exchange rates 158, the locational data 160, and the previous currency transactions 162 to the model trainer to apply to the neural network model to generate a set of results. The set of results can be multiple remittance transactions and a predicted likelihood corresponding to each transaction from the multiple remittance transactions. If the results are above the corresponding threshold, the multiple remittance transactions and each of their corresponding predicted likelihoods can be stored in memory.

At 506, a request from the user is received from the communications module to access a remittance page. The system can receive a request from a client device to access a remittance page. The request can be a notification from an application of the client device.

At 508, in response to receiving the request, the at least one currency exchange transaction that was previously generated for the user is selected from the repository of predicted likelihoods for currency exchange transactions. In response to receiving a request from the client device 102 to request remittance data, the predictive modeling module 136 provides a selected remittance transaction selected from the predicted likelihoods 156 to the user interface engine 138. The predictive modeling module 136 can select a remittance transaction corresponding to the top predicted likelihood stored in the predicted likelihoods 156. In some instances, the predictive modeling module 136 can select a set of remittance transactions corresponding to predicted likelihoods that are greater than a predetermined threshold, such as 65%, to provide to the user interface engine 138.

At 510, remittance data associated with a user interface (UI) element is generated, the remittance data including data associated with the currency exchange transaction and instructions associated with the UI element. A user interface engine generates a UI element to provide to the client device 102. The UI data includes the selected remittance transaction from the predicted likelihoods 156 and other data, such as current exchange rate data, and a timeframe for allowing the user to select the remittance transaction to execute. In particular, the timeframe is set to ensure that the exchange rate stays locked for a particular remittance transaction until the time period elapses. Before the user interface engine 138 generates the graphics data, the user interface engine 138 ensures the user from the user profile 146 has sufficient funds in his bank account (e.g., in the financial data 148) to support the generated remittance transaction. In response to determining that the remittance transaction meets the threshold of sufficient funds in the user profile 146 financial data 148, the user interface engine 138 generates the graphics data. The graphics data can include a UI element (e.g., a button) that allows the user at the client device 102 to interact with to execute the selected remittance transaction. The graphics data can include other data associated with the selected remittance transaction, such as, for example, a source location, a destination location, a money amount transferring from the source location, a money amount transferring to the destination location, a current exchange rate that is locked in place, the timeframe the current exchange rate is locked in place, a current time, and a current balance of the user's financial data.

At 512, the remittance data is transmitted to the user via the communications module. After the user interface engine 138 generates the graphics data, the user interface engine 138 transmits the graphics data to the client device 102 for the user's display. At the client device 102, the user can either select the UI element to execute the generated remittance transaction or close the page showing the UI element and the data corresponding to the generated remittance transaction.

At 514, an indication from the user is received via the communications module for interacting with the UI element corresponding to the currency exchange transaction. If the user selects the UI element on the client device 102 to execute the remittance transaction, the backend conversational interface 129 receives an indication from the client device 102 to execute the remittance transaction. The backend conversational interface 129 transmits a notification to the financial engine 140 to execute the remittance transaction. In particular, the notification includes data corresponding to the remittance transaction, the user corresponding to the remittance transaction, and the financial data corresponding to the remittance information.

At 516, the currency exchange transaction is executed in response to receiving the indication. In response to the financial engine 140 receiving the indication to execute the remittance transaction, the financial engine 140 executes the remittance transaction and stores an indication of the execution of the remittance transaction in the previous currency transactions 162. In some instances, the financial engine 140 may use the payment network(s) 124 and a particular eCommerce site 126 to execute the remittance transaction.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
a communications module;
at least one memory storing instructions and a repository of parameters for predicted data exchange transactions, wherein the data exchange transactions include currency exchange transactions; and
at least one hardware processor interoperably coupled with the at least one memory and the communications module, wherein the instructions instruct the at least one hardware processor to:
retrieve historical transaction data corresponding to parameters of at least one historical data exchange transaction of a user, wherein the parameters comprise a transmitted currency from the user, a received currency by a recipient, a time the at least one historical data exchange transaction was submitted, and an exchange rate of the at least one historical data exchange transaction;
generate, using a predictive model and based on the retrieved historical transaction data, a predicted likelihood, for each of the at least one historical data exchange transaction, where the predicted likelihood represents a likelihood of the user selecting, for a subsequent remittance request, parameters for the subsequent remittance request that match the parameters of the historical data exchange transaction;
rank the at least one historical data exchange transaction according to predicted likelihoods;
store parameters for at least one highest ranked historical data exchange transaction in response to determining that the predicted likelihoods of the at least one highest ranked historical data exchange transaction are each greater than a threshold value;

receive, via the communications module, the subsequent remittance request from a device associated with the user, wherein the subsequent remittance request comprises a request to access a remittance page;

in response to receiving the subsequent remittance request, select, from the repository of parameters for predicted data exchange transactions, the parameters for a highest ranked historical data exchange transaction;

automatically generate remittance data associated with a user interface (UI) element for a current data exchange transaction including a currency exchange transaction, the remittance data comprising the parameters for the highest ranked historical data exchange transaction and instructions associated with the UI element;

automatically transmit, via the communications module and to the device, the remittance data;

receive, via the communications module, an indication from the device for interacting with the UI element corresponding to the current data exchange transaction, wherein receiving comprises:

determining, in response to receiving the indication from the user for interacting with the UI element corresponding to the currency exchange transaction, that the exchange rate for the currency exchange transaction has changed from a previously presented exchange rate in the remittance data to a new exchange rate after transmitting the remittance data; and transmitting, via the communications module, a notification to the user indicating that the exchange rate has changed to the new exchange rate and a request for approval from the user to proceed with the currency exchange transaction using the new exchange rate; and in response to receiving an indication of the approval, execute the current data exchange transaction including the currency exchange transaction using the new exchange rate.

2. The system of claim 1, wherein the at least one exchange rate comprises a rate for a source country, a rate for a destination country, a conversation rate between the source country and the destination country, and a current time of the exchange rate.

3. The system of claim 1, wherein the predictive model comprises at least one of a classification model or a probabilistic model.

4. The system of claim 1, wherein generating the remittance data comprising the UI element further comprises generating a selectable UI element button for receiving a selection from the user for selecting the currency exchange transaction to execute.

5. The system of claim 4, wherein generating the selectable UI element button for receiving the selection from the user for selecting the currency exchange transaction to execute further comprises generating the selectable UI element button for displaying to the user data pertaining to the currency exchange transaction a source country, a destination country, a source amount, a destination amount, an exchange rate, and a current time.

6. The system of claim 1, wherein the data associated with the currency exchange transaction further comprises a sending amount, a received amount, a time for executing the currency exchange transaction, an elapsed time that the exchange rate is currently locked, a current balance of the user, a location for sending the currency exchange transaction, a location of the user, and a remaining balance of the user after the currency exchange transaction is to be executed.

7. The system of claim 1, wherein the predicted likelihood of the user selecting the currency exchange transaction is further based on current account information that comprises an identification of the user, an account balance of the user, and a current time of the account balance.

8. The system of claim 1, wherein the exchange rate and a current time are transmitted with customer account information and the remittance data for presentation in association with a selectable UI element button.

9. The system of claim 1, wherein the currency exchange transaction is associated with a foreign currency exchange transaction.

10. The system of claim 1, wherein the currency exchange transaction is associated with a digital currency exchange transaction.

11. A non-transitory, computer-readable medium storing computer-readable instructions executable by a computer and configured to:

retrieve historical transaction data corresponding to parameters of at least one historical data exchange transaction of a user, wherein the parameters comprise a transmitted currency from the user, a received currency by a recipient, a time the at least one historical data exchange transaction was submitted, and an exchange rate of the at least one historical data exchange transaction, wherein the historical data exchange transactions include currency change transactions;

generate, using a predictive model and based on the retrieved historical transaction data, a predicted likelihood, for each of the at least one historical data exchange transaction, where the predicted likelihood represents a likelihood of the user selecting, for a subsequent remittance request, parameters for the subsequent remittance request that match the parameters of the historical data exchange transaction;

rank the at least one historical data exchange transaction according to predicted likelihoods;

store parameters for at least one highest ranked historical data exchange transaction in response to determining that the predicted likelihoods of the at least one highest ranked historical data exchange transaction are each greater than a threshold value;

receive, via a communications module, the subsequent remittance request from a device associated with the user, wherein the subsequent remittance request comprises a request to access a remittance page;

in response to receiving the subsequent remittance request, select, from a repository of parameters for predicted data exchange transactions, the parameters for a highest ranked historical data exchange transaction;

automatically generate remittance data associated with a user interface (UI) element for a current data exchange transaction including a currency exchange transaction, the remittance data comprising the parameters for the highest ranked historical data exchange transaction and instructions associated with the UI element;

automatically transmit, via the communications module and to the device, the remittance data;

receive, via the communications module, an indication from the device for interacting with the UI element corresponding to the current data exchange transaction, wherein receiving comprises:
   determining, in response to receiving the indication from the user for interacting with the UI element corresponding to the currency exchange transaction, that the exchange rate for the currency exchange transaction has changed from a previously presented exchange rate in the remittance data to a new exchange rate after transmitting the remittance data; and
   transmitting, via the communications module, a notification to the user indicating that the exchange rate has changed to the new exchange rate and a request for approval from the user to proceed with the currency exchange transaction using the new exchange rate; and
   in response to receiving an indication of the approval, execute the current data exchange transaction including the currency exchange transaction using the new exchange rate.

12. The computer-readable medium of claim 11, wherein the at least one exchange rate comprises a rate for a source country, a rate for a destination country, a conversation rate between the source country and the destination country, and a current time of the exchange rate.

13. The computer-readable medium of claim 11, wherein the predictive model comprises at least one of a classification model or a probabilistic model.

14. The computer-readable medium of claim 11, wherein generating the remittance data comprising the UI element further comprises generating a selectable UI element button for receiving a selection from the user for selecting the currency exchange transaction to execute.

15. A computerized method performed by one or more processors, the method comprising:
   retrieving historical transaction data corresponding to parameters of at least one historical data exchange transaction of a user, wherein the parameters comprise a transmitted currency from the user, a received currency by a recipient, a time the at least one historical data exchange transaction was submitted, and an exchange rate of the at least one historical data exchange transaction, wherein the historical data exchange transactions include currency exchange transactions;
   generating, using a predictive model and based on the retrieved historical transaction data, a predicted likelihood, for each of the at least one historical data exchange transaction, where the predicted likelihood represents a likelihood of the user selecting, for a subsequent remittance request, parameters for the subsequent remittance request that match the parameters of the historical data exchange transaction;
   ranking the at least one data exchange transaction according to predicted likelihoods;
   storing, in a repository of parameters for predicted data exchange transactions, parameters for at least one highest ranked historical data exchange transaction in response to determining that the predicted likelihoods of the at least one highest ranked historical data exchange transaction are each greater than a threshold value;
   receiving, via a communications module, the subsequent remittance request from a device associated with the user, wherein the subsequent remittance request comprises a request to access a remittance page;
   in response to receiving the subsequent remittance request, selecting, from the repository of parameters for predicted data exchange transactions, the parameters for a highest ranked historical exchange transaction;
   automatically generating remittance data associated with a user interface (UI) element for a current data exchange transaction including a currency exchange transaction, the remittance data comprising the parameters for the highest ranked historical data exchange transaction and instructions associated with the UI element;
   automatically transmitting, via the communications module and to the device, the remittance data;
   receiving, via the communications module, an indication from the device for interacting with the UI element corresponding to the current data exchange transaction, wherein receiving comprises:
      determining, in response to receiving the indication from the user for interacting with the UI element corresponding to the currency exchange transaction, that the exchange rate for the currency exchange transaction has changed from a previously presented exchange rate in the remittance data to a new exchange rate after transmitting the remittance data; and
      transmitting, via the communications module, a notification to the user indicating that the exchange rate has changed to the new exchange rate and a request for approval from the user to proceed with the currency exchange transaction using the new exchange rate; and
   in response to receiving an indication of the approval, executing the current data exchange transaction including the currency exchange transaction using the new exchange rate.

* * * * *